United States Patent
Moore

(10) Patent No.: US 11,988,894 B2
(45) Date of Patent: May 21, 2024

(54) LENS DISPLACEMENT DETECTION CIRCUIT FOR AN OPTICAL DEVICE

(71) Applicant: STMicroelectronics (Research & Development) Limited, Marlow (GB)

(72) Inventor: John Kevin Moore, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 633 days.

(21) Appl. No.: 17/186,179

(22) Filed: Feb. 26, 2021

(65) Prior Publication Data
US 2022/0276461 A1     Sep. 1, 2022

(51) Int. Cl.
| | |
|---|---|
| G02B 7/10 | (2021.01) |
| G02B 7/02 | (2021.01) |
| H04N 23/54 | (2023.01) |

(52) U.S. Cl.
CPC ............. G02B 7/102 (2013.01); G02B 7/021 (2013.01); H04N 23/54 (2023.01)

(58) Field of Classification Search
CPC .......... G02B 7/102; G02B 7/021; G02B 7/02; G02B 7/023; G02B 7/003; H04N 23/54; G01V 3/00
See application file for complete search history.

(56) References Cited

U.S. PATENT DOCUMENTS

| | | | |
|---|---|---|---|
| 5,317,351 A * | 5/1994 | Takahara | G01D 5/2412 |
| | | | 324/660 |
| 6,678,292 B2 | 1/2004 | Wickstrom et al. | |
| 9,683,841 B2 | 6/2017 | Last | |
| 10,123,003 B2 | 11/2018 | Malaescu et al. | |
| 2019/0086761 A1 | 3/2019 | Galstian et al. | |
| 2019/0167400 A1 | 6/2019 | Barnes et al. | |

FOREIGN PATENT DOCUMENTS

| | | |
|---|---|---|
| WO | 2011099272 A1 | 8/2011 |
| WO | 2019180316 A1 | 9/2019 |

* cited by examiner

Primary Examiner — James C. Jones
(74) Attorney, Agent, or Firm — Crowe & Dunlevy LLC

(57) ABSTRACT

A lens is positioned to be received by a lens holder. The lens includes a first electrical trace and the lens holder includes a second electrical trace. The first and second electrical traces form electrodes of a sense capacitor. A capacitance of the sense capacitor is sensed. From the sensed capacitance, a determination is made as to whether the lens is present and properly positioned in the lens holder.

23 Claims, 2 Drawing Sheets

LENS DISPLACEMENT DETECTION CIRCUIT FOR AN OPTICAL DEVICE

TECHNICAL FIELD

The present disclosure generally concerns an optical device including a lens structure and, in particular, a circuit for detecting displacement of the lens structure.

BACKGROUND

Reference is made to FIG. 1 which shows a cross-sectional view of an optical device 10. The device 10 includes a support substrate 12 with an integrated electrical connection network 14 that electrically connects electrical pads 16 on the front side of the substrate 12 to electrical pads 18 on the back side of the substrate 12. The support substrate 12 may, for example, comprise a printed circuit board (PCB). An integrated circuit light source 20 is mounted to the front side of the substrate 12 and electrically connected to the electrical pads 16. The integrated circuit light source 20 may comprise, for example, a vertical cavity surface emitter laser (VCSEL), a light emitting diode (LED) or an edge emitting laser that is selectively actuated to emit light 26. A control integrated circuit 22 is also mounted to the front side of the substrate 12 and electrically connected to the electrical pads 16. The control integrated circuit 22 is electrically connected to the integrated circuit light source 20 and is functionally operable to control operation of the integrated circuit light source 20. For example, the control integrated circuit 22 may include a driver circuit for driving the light emission function of the integrated circuit light source 20. The control integrated circuit 22 may further include an optical sensing circuit that functions to detect light 26 emitted from the integrated circuit light source 20.

The integrated circuit light source 20 may emit the light 26 with a high optical power over a narrow field of view. This intensity of light 26 can exceed eye safety thresholds and result in retinal damage. However, the total amount of power that can be transmitted in a safe way can exceed a baseline limit if a lens 40 is added to the optical device 10. This is shown in FIG. 2. A lens holder 42 is mounted to the front side of the substrate 12. The lens 40 is received by and secured to the lens holder 42. It is important for the lens 40 to be accurately seated within the lens holder 42

There is a need in the art to be able to detect the presence and proper positioning of the lens 40 as received by the lens holder 42.

SUMMARY

In an embodiment, an optical device comprises: a lens holder; a lens; wherein the lens holder is configured to receive the lens; wherein the lens includes a first electrical trace; wherein the lens holder includes a second electrical trace; and wherein the first and second electrical traces form electrodes of a sense capacitor.

In an embodiment, a method comprises: positioning a lens to be received by a lens holder; wherein the lens includes a first electrical trace; wherein the lens holder includes a second electrical trace; wherein the first and second electrical traces form electrodes of a sense capacitor; sensing a capacitance of the sense capacitor; and determining from the sensed capacitance whether the lens is present and properly positioned in the lens holder.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION

Figure 1:
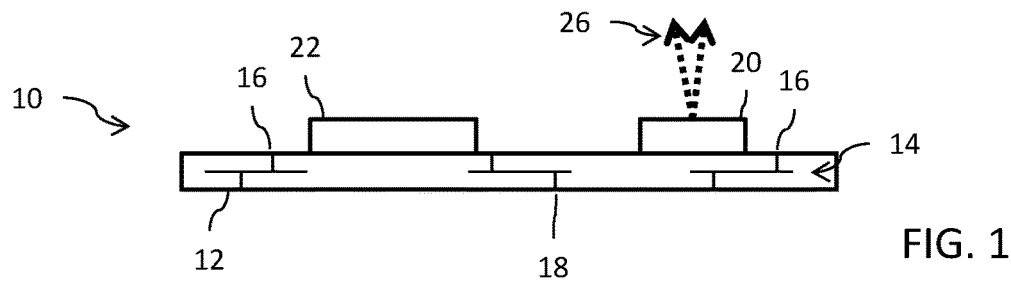
FIG. 1 is a cross-sectional view of an optical device.

The same elements have been designated with the same reference numerals in the different drawings. In particular, the structural and/or functional elements common to the different embodiments may be designated with the same reference numerals and may have identical structural, dimensional, and material properties.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

The terms "about", "substantially", and "approximately" are used herein to designate a tolerance of plus or minus 10%, preferably of plus or minus 5%, of the value in question.

Figure 2:
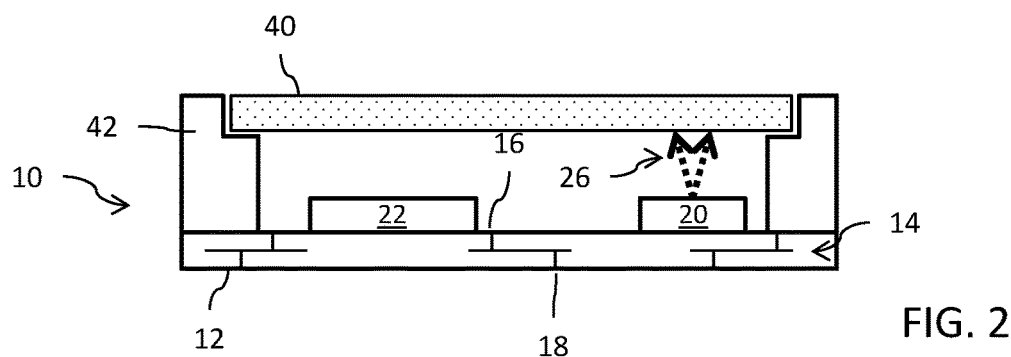
FIG. 2 is a cross-sectional view of an optical device with a lens secured by a lens holder.
Figure 3:
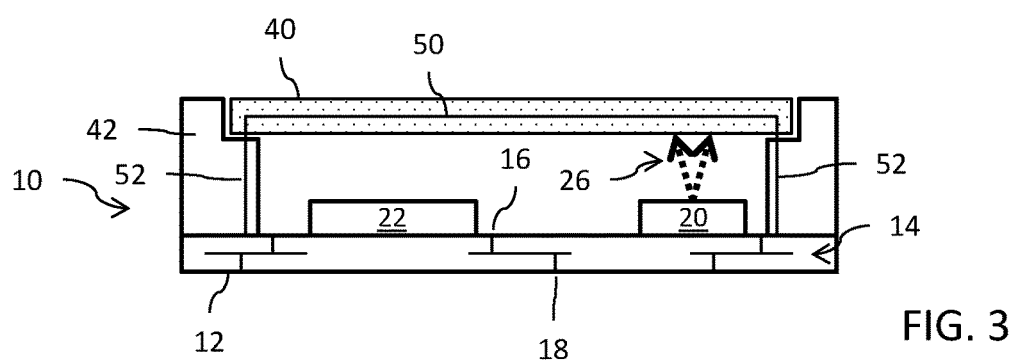
FIG. 3 is a cross-sectional view of an optical device with a lens and a lens displacement detection circuit.

Reference is now made to FIG. 3 which shows a cross-sectional view of an optical device 10 with a lens and a lens displacement detection circuit. Like reference numbers in FIG. 3 refer to same or similar parts as shown in FIGS. 1 and 2 and previously described herein. In order to ensure safe operation, it is critical for the control integrated circuit 22 to be able to confirm the presence and proper positioning of the lens 40 (for example, seated in proper alignment and secured to the lens holder 42). The lens 40 is configured to include an electrical trace 50. This electrical trace 50 may, for example, be provided to extend along a surface of the lens 40. The surface may, for example, be a side (edge) surface or bottom surface of the lens 40. The lens holder 42 includes an electrical connection circuit 52 that supports making an ohmic electrical connection to the electrical trace 50 and supports making an ohmic electrical connection to the electrical pads 16 of the integrated electrical connection network 14 on the front side of the substrate 12. The electrical connection circuit permits the control integrated circuit 22 to electrically connect to the electrical trace 50 in the lens 40. To detect the presence and proper positioning of the lens 40, the control integrated circuit 22 can apply a voltage or current through the electrical connection circuit 52 to the electrical trace 50 and perform a continuity check. For example, this can be an application of a current or voltage to one end of the electrical trace 50 with a detection of that current/voltage at the other end of the electrical trace 50. Or, this can be the application of a voltage across the electrical trace with a measurement of the voltage drop from one end to the other end of the electrical trace 50. If the continuity check is confirmed, then the lens 40 is present and the control integrated circuit 22 can drive the operation of the light source 20 to provide light 26 output through the lens 40.

Figure 4:
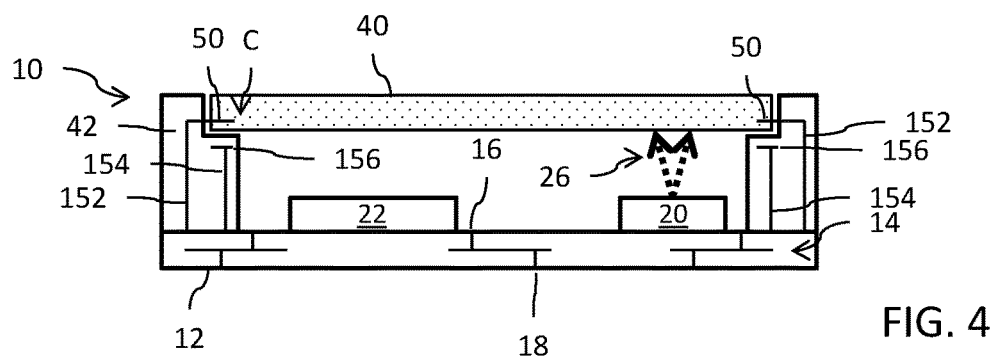
FIG. 4 is a cross-sectional view of an optical device with a lens and a lens displacement detection circuit.

Reference is now made to FIG. 4 which shows a cross-sectional view of an optical device 10 with a lens and a lens displacement detection circuit. Like reference numbers in FIG. 4 refer to same or similar parts as shown in FIGS. 1 and 2 and previously described herein. In order to ensure safe operation, it is critical for the control integrated circuit 22 to be able to confirm presence and proper positioning of the lens 40 (for example, seated in proper alignment and secured to the lens holder 42). The lens 40 is configured to include an electrical trace 50. This electrical trace 50 may, for example, be provided to extend along a surface of the lens 40. The surface may, for example, be a side (edge) surface or bottom surface of the lens 40. The trace 50 may have the shape and form of a conductive line or a conductive layer. Because the trace 50 is provided on the lens 40, the trace may be made of a transparent conductive material such as indium-tin-oxide (ITO). Alternatively, an opaque metal such as copper may be used, with the trace 50 positioned in a location where it will not interfere with the optical operation of the device. The lens holder 42 includes a first electrical connection circuit 152 that supports making an ohmic electrical connection to the electrical trace 50 and supports making an ohmic electrical connection to the electrical pads 16 of the integrated electrical connection network 14 on the front side of the substrate 12. The lens holder 42 further includes a second electrical connection circuit 154 that supports making a capacitive electrical connection to the electrical trace 50 and supports making an ohmic electrical connection to the electrical pads 16 of the integrated electrical connection network 14 on the front side of the substrate 12. The first and second electrical connection circuits 152 and 154 permit the control integrated circuit 22 to electrically couple to the electrical trace 50 in the lens. To detect presence and proper positioning of the lens 40, the control integrated circuit 22 can apply a current to charge a sensing capacitor C having a first capacitor electrode formed by the electrical trace 50 in the lens and a second capacitor electrode formed by a parallel extending electrical trace 156 associated with the second electrical connection circuit 154 in the lens holder 42 (where, for example, the first electrical connection circuit 152 is coupled, preferably connected, to a supply voltage node such as ground). For example, this can be an application of a current to the second electrical connection circuit 154 and trace 156 which is capacitively coupled to the electrical trace 50. A circuit can then be used to detect the voltage stored by the sensing capacitor. The trace 156 may have the shape and form of a conductive line or a conductive layer.

Figure 5:
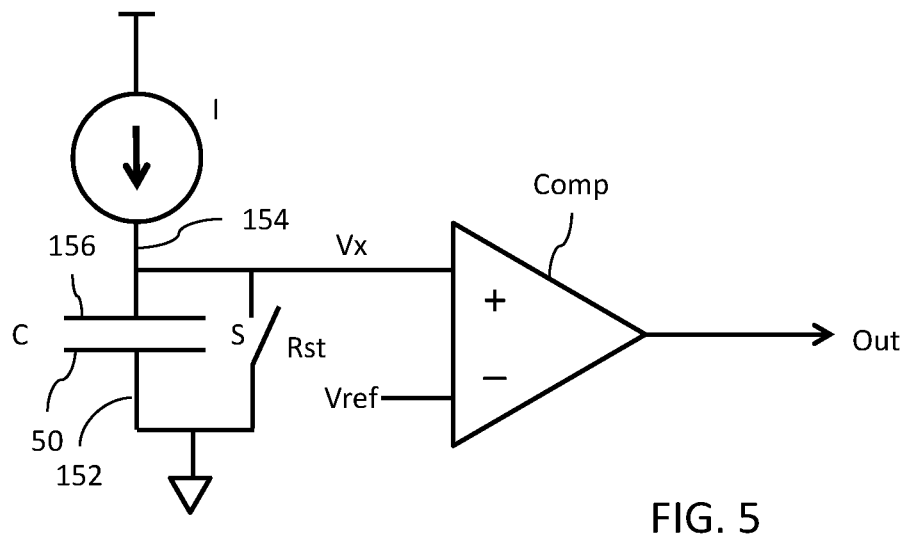
FIG. 5 is a circuit diagram for the lens displacement detection circuit.

Reference is now made to FIG. 5 which shows a circuit diagram for a lens displacement detection circuit 200 implemented by the control integrated circuit 22. A current source 202 generates a charging current Ic that is applied through the second electrical connection circuit 154 to the electrical trace 156. A capacitor C is formed by the parallel extending electrical traces 156 and 50. The electrical trace 50 in the lens is electrically coupled to ground through the first electrical connection circuit 152. A switch S is connected in parallel with the sensing capacitor C. The switch S is actuated in response to a periodic control signal Rst. The capacitive sensing node Vx at the electrical trace 156 of the capacitor C is coupled to a non-inverting input of a comparator circuit Comp. The inverting input of the comparator Comp receives a reference voltage Vref. An output signal Out is generated by the comparator circuit in response to a comparison of the voltage capacitive sensing node Vx to the reference voltage Vref. The output signal Out has a pulse width that is indicative of a capacitance of the sense capacitor C.

Figure 6:
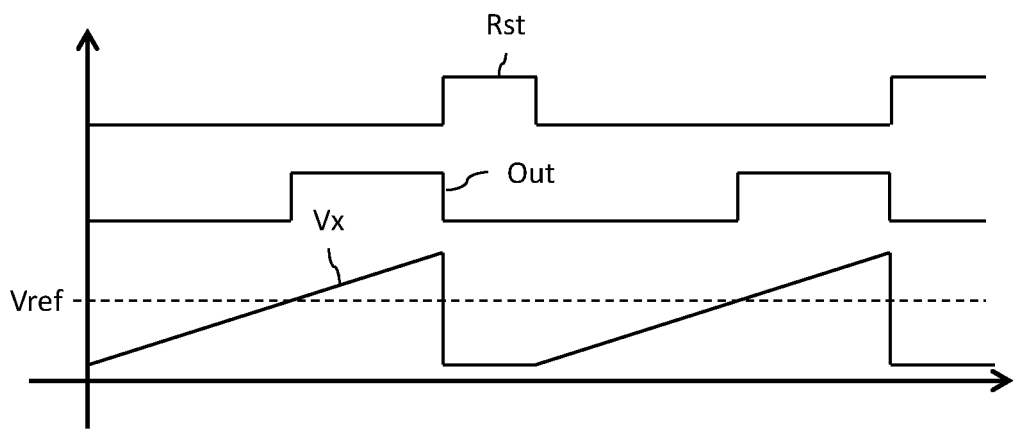
FIG. 6 is a timing diagram illustrating operation of the lens displacement detection circuit.

FIG. 6 is a timing diagram illustrating operation of the lens displacement detection circuit 200. The control signal Rst is a periodic signal. When control signal Rst is logic low, the switch S is deactuated (i.e., open) and the current I is applied to charge the sensing capacitor C. The voltage at the voltage capacitive sensing node Vx rises in response to the applied charging current I at a rate which is dependent on the capacitance of the sensing capacitor C. This capacitance of sensing capacitor C is dependent on the presence and positioning of the lens 40 within the lens holder 42. When the voltage at the voltage capacitive sensing node Vx exceeds the reference voltage, the output signal Out changes to a logic high state. When control signal Rst is logic high, the switch S is actuated (i.e., closed) and the sensing capacitor C is discharged. The voltage at the voltage capacitive sensing node Vx falls below the reference voltage Vref and the output signal Out changes to a logic low state. The width of the pulse in the output signal Out between the change to the logic high state and the change to the logic low state is indicative of the capacitance of the sensing capacitor C. When the lens 40 is present and properly positioned within the lens holder 42, the sensing capacitor C will have a capacitance that is within some certain range (that is known in advance, for example as a result of design, calibration and/or testing at the factory). If the lens displacement detection circuit 200 detects the output signal Out with a pulse width indicative of a capacitance within that certain range, then presence and proper positioning of the lens 40 is presumed and the light source 20 for the optical device may be enabled for operation. However, if the lens displacement detection circuit 200 detects the output signal Out with a pulse width indicative of a capacitance that is outside of that certain range, then presence and proper positioning of the lens 40 cannot be presumed and the light source 20 for the optical device is disabled for operation.

The certain range for the capacitance of the sense capacitor C may be set as a manufacturing parameter. Alternatively, the certain range for the capacitance of the sense capacitor C may be established during testing and trimming of the optical device.

The use of a capacitive sensor as in the embodiment of FIG. 4 is preferable to the use of a resistive/continuity sensor as in the embodiment of FIG. 3 at least because the capacitive solution is more robust and is capable of providing a more accurate detection of lens (optics) displacement. The sensed capacitance value can provide a wide range of information regarding optical alignment of the lens and is more sensitive to optical displacement.

Figure 7:
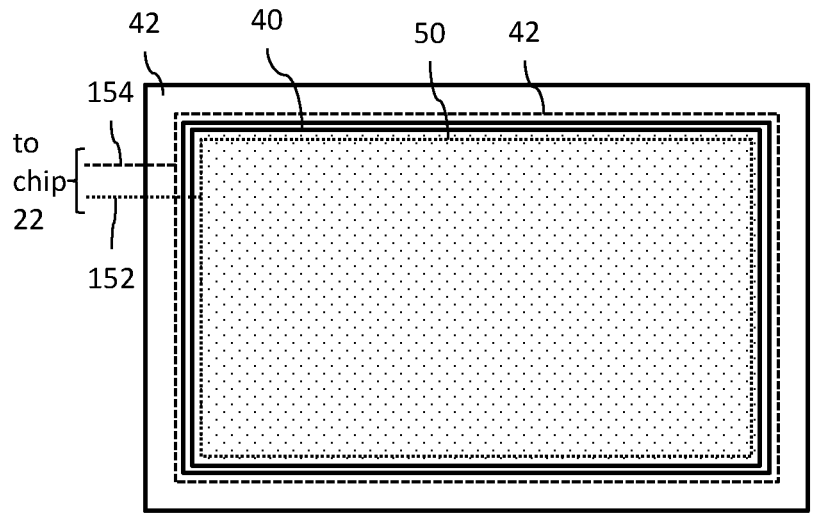
FIG. 7 is a top of a lens and lens holder as shown in FIG. 4, for example, with a capacitive optical positioning sensor.

Reference is now made to FIG. 7 which shows a top view of the optical device. The lens 40 includes the electrical trace 50 (indicated by the dotted-line) in the form of a closed loop. The lens holder 42 includes the electrical trace 156 (indicated by the dashed-line) in the form of a closed loop. The two closed loops are concentric, with the sides of the loops extending parallel to each other, to form the opposite electrodes of the sense capacitor C.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

The invention claimed is:

1. An optical device, comprising:
a lens holder;
a lens;
wherein the lens holder is configured to receive the lens;
wherein the lens includes a first electrical trace;
wherein the lens holder includes a second electrical trace; and
wherein the first and second electrical traces form electrodes of a sense capacitor;
a capacitive sensing circuit electrically coupled to the first and second electrical traces and configured to sense a capacitance of the sense capacitor; and
a light emitting circuit configured to emit light that passes through said lens, and wherein said light emitting circuit is enabled for operation if the capacitance of the sense capacitor sensed by the capacitive sensing circuit is within a certain range.

2. The optical device of claim 1, wherein said capacitance of the sense capacitor is within the certain range when the lens is present and properly positioned in the lens holder.

3. The optical device of claim 1, wherein said first electrical trace forms a first closed loop.

4. The optical device of claim 3, wherein said second electrical trace forms a second closed loop, and wherein the first and second closed loops are concentric when the lens holder receives the lens.

5. The optical device of claim 1, wherein the first and second electrical traces extend parallel to each other.

6. An optical device, comprising:
a lens holder;
a lens;
wherein the lens holder is configured to receive the lens;
wherein the lens includes a first electrical trace;
wherein the lens holder includes a second electrical trace; and
wherein the first and second electrical traces form electrodes of a sense capacitor;
a capacitive sensing circuit electrically coupled to the first and second electrical traces and configured to sense a capacitance of the sense capacitor; and
a light emitting circuit configured to emit light that passes through said lens, and wherein said light emitting circuit is disabled for operation if the capacitance of the sense capacitor sensed by the capacitive sensing circuit is outside a certain range.

7. The optical device of claim 6, wherein said capacitance of the sense capacitor is outside the certain range when the lens is not present in the lens holder.

8. The optical device of claim 6, wherein said capacitance of the sense capacitor is outside the certain range when the lens is not properly positioned in the lens holder.

9. The optical device of claim 6, wherein said first electrical trace forms a first closed loop.

10. The optical device of claim 9, wherein said second electrical trace forms a second closed loop, and wherein the first and second closed loops are concentric when the lens holder receives the lens.

11. The optical device of claim 6, wherein the first and second electrical traces extend parallel to each other.

12. A method, comprising:
positioning a lens to be received by a lens holder;
wherein the lens includes a first electrical trace;
wherein the lens holder includes a second electrical trace;
wherein the first and second electrical traces form electrodes of a sense capacitor;
sensing a capacitance of the sense capacitor;
determining from the sensed capacitance whether the lens is present and properly positioned in the lens holder; and
enabling a light emitting circuit for operation if the sensed capacitance of the sense capacitor is within a certain range.

13. A method, comprising:
positioning a lens to be received by a lens holder;
wherein the lens includes a first electrical trace;
wherein the lens holder includes a second electrical trace;
wherein the first and second electrical traces form electrodes of a sense capacitor;
sensing a capacitance of the sense capacitor;
determining from the sensed capacitance whether the lens is present and properly positioned in the lens holder; and
disabling a light emitting circuit for operation if the sensed capacitance of the sense capacitor is outside a certain range.

14. The method of claim 13, wherein said first electrical trace forms a first closed loop and wherein said second electrical trace forms a second closed loop, and wherein positioning the lens comprises arranging the first and second closed loops to be concentric.

15. The method of claim 13, wherein sensing the capacitance comprises:
applying a periodic charging to sense capacitor; and
sensing a voltage on said sense capacitor as a result of said periodic charging.

16. The method of claim 15, wherein sensing the voltage comprises comparing the voltage on said sense capacitor to a threshold and generating a periodic output signal having a pulse width that is indicative of the capacitance.

17. The method of claim 12, wherein said first electrical trace forms a first closed loop and wherein said second electrical trace forms a second closed loop, and wherein positioning the lens comprises arranging the first and second closed loops to be concentric.

18. The method of claim 12, wherein sensing the capacitance comprises:
applying a periodic charging to sense capacitor; and
sensing a voltage on said sense capacitor as a result of said periodic charging.

19. The method of claim 18, wherein sensing the voltage comprises comparing the voltage on said sense capacitor to a threshold and generating a periodic output signal having a pulse width that is indicative of the capacitance.

20. An optical device, comprising:
a lens holder;
a lens;
wherein the lens holder is configured to receive the lens;
wherein the lens includes a first electrical trace;
wherein the lens holder includes a second electrical trace; and
wherein the first and second electrical traces form electrodes of a sense capacitor;
wherein said first electrical trace forms a first closed loop;
wherein said second electrical trace forms a second closed loop; and
wherein the first and second closed loops are concentric when the lens holder receives the lens.

21. The optical device of claim 20, wherein the first and second electrical traces extend parallel to each other.

22. The optical device of claim 20, further comprising:
a circuit configured to sense a capacitance of the first and second closed loops; and
a light emitting circuit configured to emit light that passes through said lens, and wherein said light emitting circuit is enabled for operation if the sensed capacitance is within a certain range.

23. The optical device of claim 20, further comprising:
a circuit configured to sense a capacitance of the first and second closed loops; and
a light emitting circuit configured to emit light that passes through said lens, and wherein said light emitting circuit is disabled for operation if the sensed capacitance is outside a certain range.

* * * * *